(12) United States Patent  
Tokunaga et al.

(10) Patent No.: US 10,488,582 B2
(45) Date of Patent: Nov. 26, 2019

(54) PLANAR ILLUMINATION APPARATUS (71) Applicant: Minebea Mitsumi Inc., Nagano (JP)

(72) Inventors: Hideyuki Tokunaga, Fukuroi (JP);
Makoto Furuta, Fukuroi (JP); Takashi Edamitsu, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 39 days.

(21) Appl. No.: 15/626,549

(22) Filed: Jun. 19, 2017

(65) Prior Publication Data

US 2017/0371095 A1    Dec. 28, 2017

(30) Foreign Application Priority Data

Jun. 24, 2016   (JP) ................ 2016-125888
Mar. 16, 2017   (JP) ................ 2017-051370

(51) Int. Cl.
F21V 7/04    (2006.01)
F21V 8/00    (2006.01)

(52) U.S. Cl.
CPC ........... *G02B 6/0088* (2013.01); *G02B 6/009* (2013.01); *G02B 6/0051* (2013.01);
(Continued)

(58) Field of Classification Search
CPC .. G02B 6/0088; G02B 6/0051; G02B 6/0053; G02B 6/0055; G02B 6/0083
(Continued)

(56) References Cited

U.S. PATENT DOCUMENTS 6,123,430 A    9/2000  Ono et al.
7,267,471 B2 * 9/2007  Torihara ............... G02B 6/0043
                                                   362/561
(Continued)

FOREIGN PATENT DOCUMENTS

CN    101796344 A    8/2010
CN    205176444 U    4/2016
(Continued)

OTHER PUBLICATIONS

Notification of Reasons for Refusal dated Jun. 19, 2018 for corresponding Japanese Application No. 2017-051370 and English translation.

(Continued)

*Primary Examiner* — Matthew J. Peerce
(74) *Attorney, Agent, or Firm* — Pearne & Gordon LLP (57) ABSTRACT A planar illumination apparatus according to an embodiment includes a light guide plate that emits light from an emission surface, the light being incident on a lateral surface of the light guide plate; a light source that is arranged on the lateral surface side and has a light emitting surface that emits light to be incident on the lateral surface; a substrate that has two principal surfaces, a surface opposite to the light emitting surface of the light source being mounted on one of the principal surfaces; a frame that has a lateral surface and a floor surface, and accommodates the light guide plate, the light source, and the substrate; and a first coupling member that is arranged between the light guide plate and the floor surface and between the light source and the floor surface, and couples the light guide plate and the light source.

19 Claims, 5 Drawing Sheets (52) U.S. Cl.
CPC ......... *G02B 6/0053* (2013.01); *G02B 6/0055* (2013.01); *G02B 6/0083* (2013.01)

(58) Field of Classification Search
USPC ........................................................ 362/606
See application file for complete search history.

(56) References Cited

U.S. PATENT DOCUMENTS

| | | | |
|---|---|---|---|
| 8,235,572 B2* | 8/2012 | Hsu | G02F 1/133615 349/58 |
| 2011/0007520 A1 | 1/2011 | Shigeta et al. | |
| 2012/0250352 A1* | 10/2012 | Hirasawa | G02B 6/0085 362/611 |
| 2013/0070476 A1 | 3/2013 | Kunimochi | |
| 2014/0307464 A1 | 10/2014 | Horiuchi et al. | |
| 2015/0036385 A1 | 2/2015 | Kawai | |
| 2017/0235039 A1* | 8/2017 | Kaneshiro | G02B 6/0031 362/609 |
| 2017/0371095 A1 | 12/2017 | Tokunaga et al. | |

FOREIGN PATENT DOCUMENTS

| | | |
|---|---|---|
| CN | 207020329 U | 2/2018 |
| JP | 10-247413 A | 9/1998 |
| JP | 2002-156632 A | 5/2002 |
| JP | 2006-154320 A | 6/2006 |
| JP | 2009-032664 A | 2/2009 |
| JP | 2011-018587 A | 1/2011 |
| JP | 2012-069245 A | 4/2012 |
| JP | 2012-212526 A | 11/2012 |
| JP | 2013-065404 A | 4/2013 |
| JP | 2014-120319 A | 6/2014 |
| JP | 2014-206603 A | 10/2014 |
| JP | 2015-032366 A | 2/2015 |
| JP | 2015-210963 A | 11/2015 |
| WO | 2011/025017 A1 | 3/2011 |

OTHER PUBLICATIONS

Notification of Reasons for Refusal dated Nov. 20, 2018 for corresponding Japanese Application No. 2017-051370 and English translation.
First Chinese Office Action dated Apr. 22, 2019 for corresponding Chinese Application No. 201710485399.0 and English translation.

* cited by examiner

PLANAR ILLUMINATION APPARATUS

CROSS-REFERENCE TO RELATED APPLICATIONS

The present application claims priority to and incorporates by reference the entire contents of Japanese Patent Application No. 2016-125888 filed in Japan on Jun. 24, 2016 and Japanese Patent Application No. 2017-051370 filed in Japan on Mar. 16, 2017.

BACKGROUND OF THE INVENTION

1. Field of the Invention

The present invention relates to a planar illumination apparatus.

2. Description of the Related Art

There is a planar illumination apparatus in which top-view type light emitting diodes (LEDs) are arranged so as to face a light incident surface of a light guide plate. A related-art example is described in Japanese Patent Application Laid-open No. 2002-156632.

In recent years, along with the demand for thinning of a planar illumination apparatus, the thickness of the light guide plate has become relatively small with respect to the thickness of the LED. Accordingly, the improvement in the positioning accuracy of optical axes of the light guide plate and the LEDs is important for stabilizing at a high level the luminance characteristics such as luminance and luminance distribution.

SUMMARY OF THE INVENTION

A planar illumination apparatus according to one embodiment of the present invention includes a light guide plate that emits light from an emission surface, the light being incident on a lateral surface of the light guide plate; a light source that is arranged on the lateral surface side and has a light emitting surface that emits light to be incident on the lateral surface; a substrate that has two principal surfaces, a surface opposite to the light emitting surface of the light source being mounted on one of the principal surfaces; a frame that has a lateral surface and a floor surface, and accommodates the light guide plate, the light source, and the substrate; and a first coupling member that is arranged between the light guide plate and the floor surface and between the light source and the floor surface, and couples the light guide plate and the light source.

DETAILED DESCRIPTION OF THE PREFERRED EMBODIMENT

The following describes a planar illumination apparatus according to an exemplary embodiment with reference to the accompanying drawings. In the drawings, the relation of dimensions of respective elements, the ratios of the respective elements, and the like may be different from the reality. Between the drawings also, portions that the relation of dimensions and the ratios are different from one another may be included.

Embodiment

Figure 1:
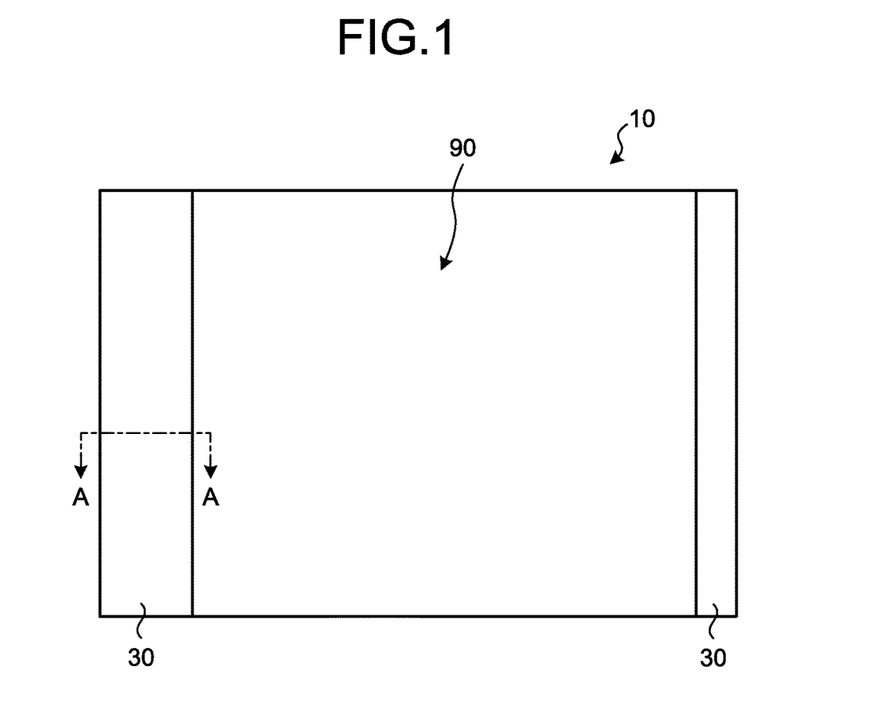
FIG. 1 is a front view illustrating one example of the appearance of a planar illumination apparatus according to an embodiment.

FIG. 1 is a front view illustrating one example of the appearance of the planar illumination apparatus in the embodiment. As illustrated in the example in FIG. 1, a planar illumination apparatus 10 in the embodiment emits light from an emission area (also referred to as an effective area) 90 that is not covered with lightproof sheets 30. That is, by the lightproof sheets 30, the effective area 90 is defined. The planar illumination apparatus 10 in the present embodiment is used as a backlight for a liquid-crystal display apparatus. Such a liquid-crystal display apparatus is used in a smartphone, for example.

In FIG. 1, the lightproof sheet 30 on the left-hand side is wider in width than the lightproof sheet 30 on the right-hand side. This is because the lightproof sheet 30 on the right-hand side covers a relatively narrow area in which LEDs 14, a flexible printed circuit (FPC) 12, and others, which will be described later, are not included and the lightproof sheet 30 on the left-hand side covers a relatively wide area in which the later-described LEDs 14, the FPC 12, and others are included. The width of the lightproof sheet 30 on the left-hand side is 1.5 mm, for example. In FIG. 1, the depiction of a lightproof sheet 31 which will be described later is omitted.

Figure 2:
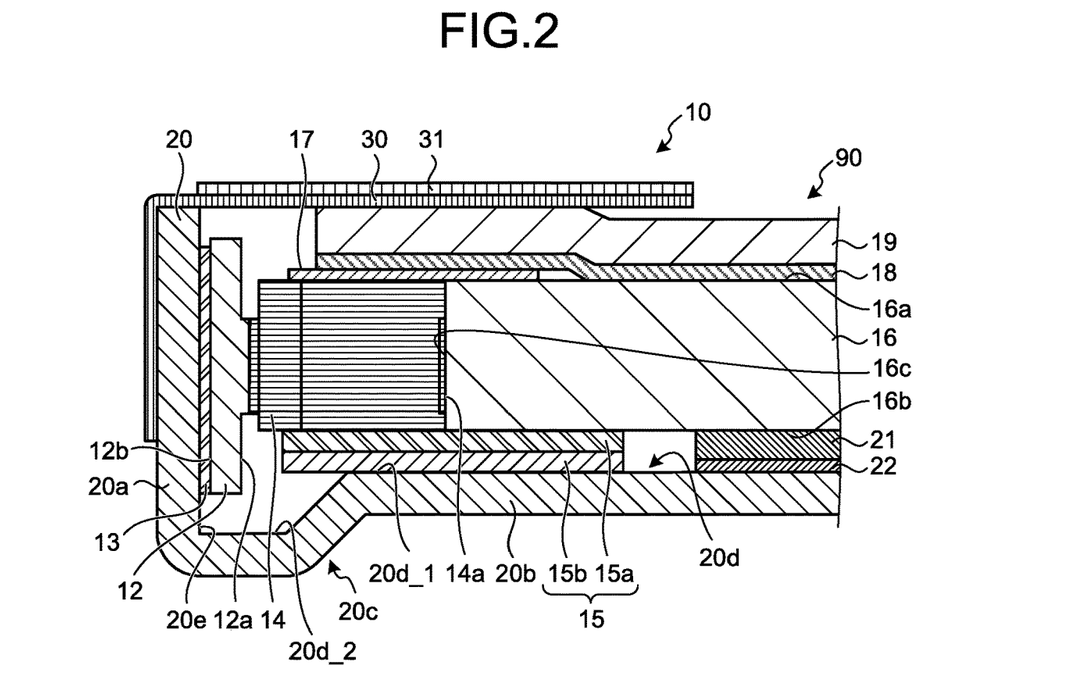
FIG. 2 is a sectional view taken along line A-A in FIG. 1.

FIG. 2 is a sectional view taken along line A-A in FIG. 1. As illustrated in FIG. 2, the planar illumination apparatus 10 includes the FPC 12, a fixing member 13, the LED 14, a first coupling member 15, a light guide plate 16, a second coupling member 17, a diffusion sheet 18, a prism sheet 19, a frame 20, a reflective sheet 21, the lightproof sheet 30, and the lightproof sheet 31.

The frame 20 accommodates the FPC 12, the fixing member 13, the LED 14, the first coupling member 15, the light guide plate 16, the second coupling member 17, the diffusion sheet 18, and the prism sheet 19. The frame 20 is a sheet-metal frame that is, for example, made of stainless steel for which the rigidity is high. The frame 20 has a lateral wall portion 20a and a bottom portion 20b.

The bottom portion 20b is a portion extending along a principal surface 16b, which will be described later, of the light guide plate 16. The bottom portion 20b has a floor surface 20d. The floor surface 20d has a planar surface 20d_1, and a recessed surface 20d_2 of a recessed portion 20c which will be described later. On the planar surface 20d_1, the light guide plate 16 and the LED 14 are placed. The lateral wall portion 20a is a portion that integrally stands up from the bottom portion 20b along a longitudinal side of a light-incident lateral surface 16c, which will be described later, of the light guide plate 16 in the direction of emitting light (the direction of the normal line of the planar surface 20d_1 of the floor surface 20d). The lateral wall portion 20a has a lateral surface 20e. The bottom portion 20b has the recessed portion 20c. The recessed portion 20c is a member for releasing the lower end portion of the FPC 12 formed so as to sink in along the lateral surface 20e in a direction opposite to the direction of emitting light from a portion of the lateral surface 20e side of the floor surface 20d. The width of the recessed portion 20c is formed being narrow so that the larger first coupling member 15 is arranged on the planar surface 20d_1 of the floor surface 20d. The recessed portion 20c has the recessed surface 20d_2. In the present embodiment, the recessed portion 20c is not an essential constituent element. Thus, the bottom portion 20b may be flat without having the recessed portion 20c, for example.

The light guide plate 16 is formed in a quadrate shape in top view by using transparent material (for example, polycarbonate resin). The light guide plate 16 has, on the outer surfaces thereof, two principal surfaces 16a and 16b and the light-incident lateral surface (light incident surface) 16c that is a lateral surface of the side on which the LED 14 is arranged. The light that the LED 14 emitted is incident on the light-incident lateral surface 16c. One principal surface 16a out of the two principal surfaces 16a and 16b is an emission surface from which the light (the light that the LED 14 emitted) incident on the light-incident lateral surface 16c is emitted. Accordingly, in the following description, "the principal surface 16a" may be described as "an emission surface 16a". Because the emission surface is also a surface that emits light, it is also referred to as a light emitting surface. On a portion of the principal surface (the principal surface other than the principal surface 16a out of the two principal surfaces) 16b side that is a surface opposite to the emission surface 16a of the light guide plate 16, an optical-path change pattern containing a plurality of dots is formed, for example. By forming the optical-path change pattern, the advancing direction of light that advances in the light guide plate 16 is changed and the light is emitted from the emission surface 16a. That is, the planar illumination apparatus 10 in the embodiment is what is called an edge light type illumination apparatus.

The reflective sheet 21 reflects light that leaked from the principal surface 16b that is opposite to the emission surface 16a, and returns the reflected light to the light guide plate 16 again. The reflective sheet 21 is arranged between the principal surface 16b of the light guide plate 16 and the floor surface 20d in a state of being fixed onto the floor surface 20d (the planar surface 20d_1 of the floor surface 20d, specifically) by a double-sided tape 22.

The double-sided tape 22 is, for example, a white double-sided tape, and a first surface thereof is affixed to part of the reflective sheet 21 and a second surface thereof is affixed to the floor surface 20d (the planar surface 20d_1 of the floor surface 20d, specifically). Accordingly, the double-sided tape 22 fixes the reflective sheet 21 onto the floor surface 20d.

The LED 14 is a point-like light source (point light source). The LED 14 is a pseudo white LED containing a blue LED and a yellow fluorescent material, for example. The LED 14 is formed in a substantially rectangular parallelepiped shape as a whole, and is what is called a top-view type LED that has a light emitting surface 14a on the surface on the opposite side of the surface that is mounted on the FPC 12. In the present embodiment, a plurality of LEDs 14 are provided, and the LEDs 14 are arranged being spaced apart at certain intervals (or being closely attached), along the longitudinal direction of the light-incident lateral surface 16c, in a state that the light emitting surfaces 14a are made to face the light-incident lateral surface 16c of the light guide plate 16. The LEDs 14 emit light toward the light-incident lateral surface 16c. As just described, the LEDs 14 emit the light to be incident on the light-incident lateral surface 16c. It is needless to say that the light source of the present invention is not limited to the point light source, but may be a linear-like light source (linear light source) in which a plurality of LEDs are integrated, for example.

The FPC 12 is a substrate that has two principal surfaces 12a and 12b. The surface opposite to the light emitting surface 14a of the LED 14 is mounted on one principal surface 12a on the LED 14 side. Via the FPC 12, electrical power from a power source not depicted is supplied to the LED 14, and the LED 14 turns on.

The fixing member 13 fixes the FPC 12 onto the lateral surface 20e of the frame 20. The fixing member 13 is, for example, a double-sided tape, and a first surface thereof is affixed to the principal surface 12b opposite to the principal surface 12a of the FPC 12 and a second surface thereof is affixed to the lateral surface 20e, and thus the FPC 12 is fixed onto the lateral surface 20e.

The first coupling member 15 is arranged between the light guide plate 16 and the floor surface 20d (the planar surface 20d_1 of the floor surface 20d, specifically) and between the LED 14 and the floor surface 20d, and couples the light guide plate 16 and the LED 14 optically or structurally. Explaining with a specific example, the first coupling member 15 couples the light-incident lateral surface 16c of the light guide plate 16 and the light emitting surface 14a of the LED 14, in a state that the optical axis of the light guide plate 16 and the optical axis of the LED 14 are matched. The first coupling member 15 is a single-sided tape of a strip-shape that assumes the direction of the LEDs 14 being juxtaposed as a major axis direction, and includes an adhesive layer (adhesive) 15a and a base material 15b. The first coupling member 15 is not limited to the single-sided tape formed with the adhesive layer 15a and the base material 15b, and it may be a single-sided tape formed with the base material 15b and with a double-sided tape affixed to the principal surface on the LED 14 side of the base material 15b, for example.

The base material 15b is PET, and the adhesive layer 15a is silicone or acrylic, for example. The adhesive layer 15a adheres on at least part of the principal surface 16b of the light guide plate 16 closer to the LED 14, and adheres on at least part of the surface on the floor surface 20d side of the LED 14 closer to the light guide plate 16. Accordingly, at least part of the principal surface 16b of the light guide plate 16 and at least part of the surface on the floor surface 20d side of the LED 14 are to be affixed to the first coupling member 15. As a result, the first coupling member 15 couples the light-incident lateral surface 16c of the light guide plate 16 and the light emitting surface 14a of the LED 14.

Because the first coupling member 15 in the present embodiment is a single-sided tape, the light guide plate 16 and the LED 14 are not fixed with respect to the floor surface 20d. Thus, even when the planar illumination apparatus 10 is subjected to some kind of force from the outside, the light guide plate 16 and the LED 14 can let the force from the outside escape. Consequently, with the planar illumination apparatus 10 in the present embodiment, it is possible to suppress the occurrence of breakage of the light guide plate 16 and the LED 14.

The first coupling member 15 includes a member that absorbs light or a member that reflects light. For example, when including a member that reflects light, the first coupling member 15 reflects the light emitted from the light emitting surface 14a of the LED 14 and returns the reflected light to the light guide plate 16 again, thereby improving the luminance.

For example, even when the thickness of the LED 14 and the thickness of the light guide plate 16 are different such as the thickness of the light guide plate 16 being thicker than the thickness of the LED 14, by using the first coupling member 15, the surface on the floor surface 20d side of the LED 14 and the principal surface 16b of the light guide plate 16 can be made flush, and the LED 14 and the light guide plate 16 can be coupled. Consequently, according to the embodiment, by using the first coupling member 15, it is possible to stabilize the coupling efficiency between the LED 14 and the light guide plate 16.

The second coupling member 17 is arranged opposite to the first coupling member 15 with respect to the light guide plate 16 and the LED 14, and couples the light guide plate 16 and the LED 14 optically or structurally. Explaining with a specific example, the second coupling member 17 couples the light-incident lateral surface 16c of the light guide plate 16 and the light emitting surface 14a of the LED 14. The second coupling member 17 is arranged between the diffusion sheet 18 which will be described later and the light guide plate 16 and between the diffusion sheet 18 and the LED 14. The second coupling member 17 is a double-sided tape, and a first surface thereof is affixed to at least part of the emission surface 16a of the light guide plate 16 closer to the LED 14 and is affixed to at least part of the surface on the opposite side of the floor surface 20d of the LED 14 closer to the light guide plate 16. Accordingly, at least part of the principal surface 16a of the light guide plate 16 and at least part of the surface on the opposite side of the floor surface 20d of the LED 14 are to be affixed to the second coupling member 17. As a result, the second coupling member 17 couples the light-incident lateral surface 16c of the light guide plate 16 and the light emitting surface 14a of the LED 14.

The other surface of the second coupling member 17 is affixed to at least part of the lateral wall portion 20a side of the diffusion sheet 18. Thus, the second coupling member 17 fixes the diffusion sheet 18 onto the light guide plate 16 and the LED 14. Accordingly, because the second coupling member 17 can restrain the diffusion sheet 18 from separating and lifting from the light guide plate 16, it is possible to suppress the deterioration of the luminance characteristics, such as luminance and luminance distribution, of the light emitted from the effective area 90.

The diffusion sheet 18 is arranged on the emission surface 16a side of the light guide plate 16, and diffuses the light emitted from the emission surface 16a. Explaining with a specific example, the diffusion sheet 18 is arranged so as to cover the emission surface 16a and at least part of the surface on the opposite side of the floor surface 20d of the LED 14, and diffuses the light emitted from the emission surface 16a. The diffusion sheet 18, as in the foregoing, is fixed onto the light guide plate 16 and the LED 14 by the second coupling member 17.

The prism sheet 19 is arranged opposite to the light guide plate 16 with respect to the diffusion sheet 18, performs light distribution control on the light diffused by the diffusion sheet 18, and emits the light on which the light distribution control has been performed.

The lightproof sheet 30 is arranged so as to cover a part of the lateral wall portion 20a side of the prism sheet 19, and blocks the light emitted from a part of the area out of the emission surface 16a of the light guide plate 16 so as to define the effective area 90 from which the light is emitted from the planar illumination apparatus 10.

For example, the lightproof sheet 30 is a single-sided tape capable of blocking light, and the portion of one end side is affixed to the outer surface of the lateral wall portion 20a of the frame 20. The surface on the prism sheet 19 side of the portion of the other end side of the lightproof sheet 30 is affixed to part of the lateral wall portion 20a side of the prism sheet 19.

The lightproof sheet 31 is a double-sided tape capable of blocking light. Out of two surfaces of the lightproof sheet 31, a first surface thereof is affixed to the portion on the other end side of the lightproof sheet 30, and a second surface thereof is affixed to a liquid-crystal display apparatus that uses the planar illumination apparatus 10 as a backlight.

Figure 3:
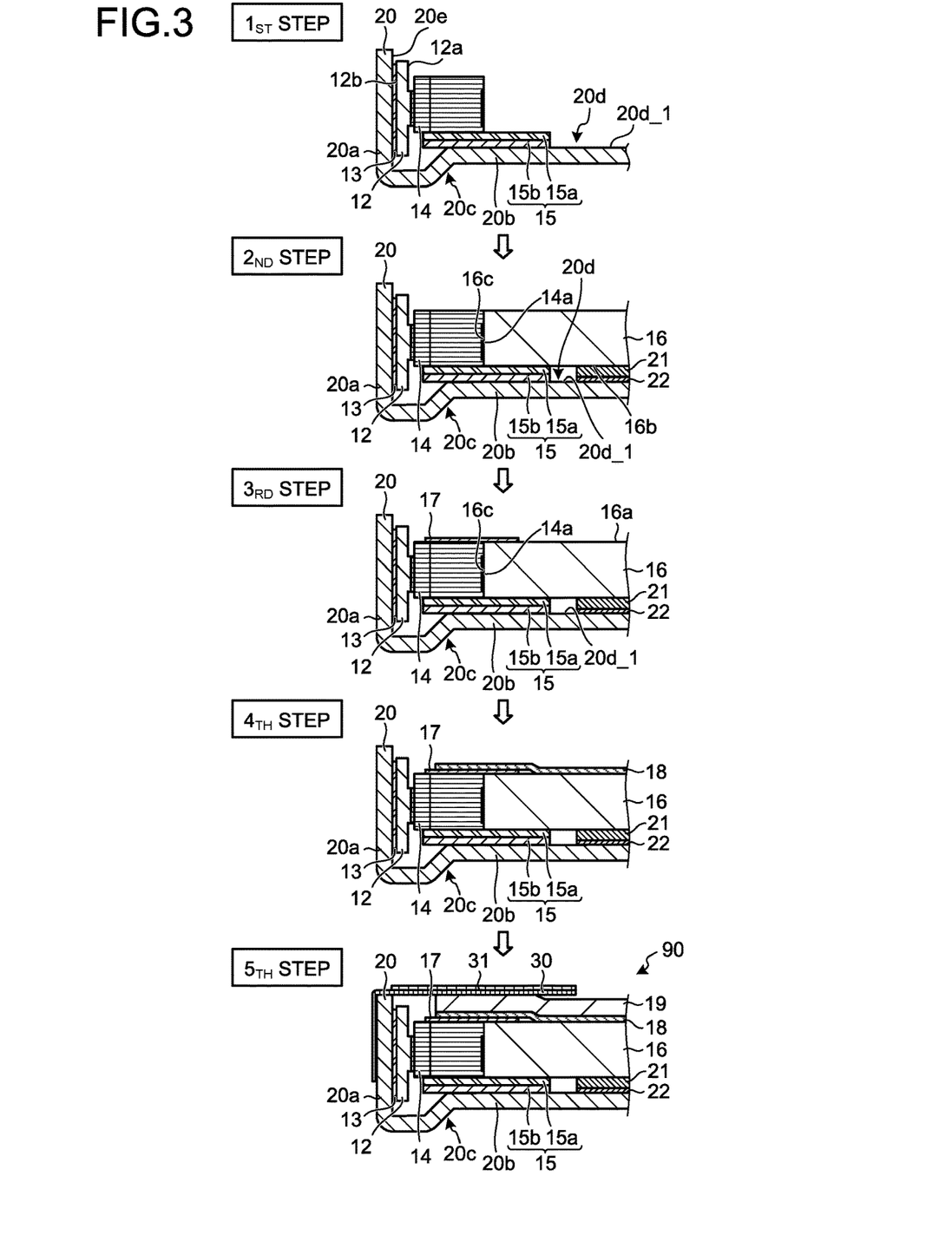
FIG. 3 is a diagram for explaining one example of a method of assembling the planar illumination apparatus in the embodiment.

Next, with reference to FIG. 3, a method of assembling the planar illumination apparatus 10 will be described. FIG. 3 is a diagram for explaining one example of the method of assembling the planar illumination apparatus 10 in the embodiment.

As illustrated in the example in FIG. 3, at the first step, the LED 14 is mounted on the principal surface 12a of the FPC 12 first. Then, the first coupling member 15 is affixed to at least part of the surface on the floor surface 20d side of the LED 14. Subsequently, the principal surface 12b of the FPC 12 is fixed onto the lateral surface 20e of the frame 20 by using the fixing member 13. For example, the first coupling member 15 is placed on the planar surface 20d_1 of the floor surface 20d, and by making the FPC 12 and the LED 14 move toward the lateral surface 20e so that the first coupling member 15 slides on the planar surface 20d_1 of the floor surface 20d, the principal surface 12b of the FPC 12 is fixed onto the lateral surface 20e by using the fixing member 13. According to the present embodiment, as just described, by a simple method of placing the first coupling member 15 on the planar surface 20d_1 of the floor surface 20d, and of making the FPC 12 and the LED 14 move toward the lateral surface 20e so that the first coupling member 15 slides on the planar surface 20d_1 of the floor surface 20d, it is possible to fix the principal surface 12b onto the lateral surface 20e by using the fixing member 13.

At the first step, after having fixed the principal surface 12b of the FPC 12 onto the lateral surface 20e by using the fixing member 13, the surface of the base material 15b side of the first coupling member 15 that is a single-sided tape may be fixed onto the floor surface 20d via an adhesive. Accordingly, even when the planar illumination apparatus 10 is subjected to some kind of force from the outside, the LED 14 and the light guide plate 16 are restrained from moving because the LED 14 and the light guide plate 16 are being fixed onto the frame 20. As a result, it is suppressed that the LED 14 and the light guide plate 16 come in contact with other members, that the optical axis of the light guide plate 16 is displaced with respect to the optical axis of the LED 14, and that the spacing between the LED 14 and the light guide plate 16 is widened. Consequently, according to the embodiment, it is possible to suppress the breakage of the LED 14 and the light guide plate 16 and the changes in the optical characteristics thereof.

At the second step, the positioning between the optical axis of the light guide plate 16 (for example, the center in the thickness direction of the light guide plate 16) and the optical axis of the LED 14 (for example, the center in the thickness direction of the LED 14) is performed with the floor surface 20d (the planar surface 20d_1 of the floor surface 20d, specifically) as the positioning reference in the thickness direction, and in a state that the two optical axes match, at least part of the principal surface 16b of the light guide plate 16 is affixed to the first coupling member 15. Accordingly, in a state that the optical axis of the light guide plate 16 and the optical axis of the LED 14 match up and the light-incident lateral surface 16c of the light guide plate 16 and the light emitting surface 14a of the LED 14 are coupled, the light guide plate 16 is fixed with respect to the LED 14. Consequently, with the planar illumination apparatus 10 in the present embodiment, the positioning accuracy of the optical axes of the light guide plate 16 and the LED 14 is improved. Thus, with the planar illumination apparatus 10 in the present embodiment, it is possible to stabilize at a high level the luminance characteristics such as luminance and luminance distribution. With the planar illumination apparatus 10 in the present embodiment, because the thickness of the first coupling member 15 that couples the light guide plate 16 and the LED 14 is thin, it is possible to meet the demand for thinning. From the foregoing, with the planar illumination apparatus 10 of the present embodiment, it is possible to have excellent luminance characteristics while meeting the demand for thinning.

When the thickness of the LED 14 and the thickness of the light guide plate 16 are different (in particular, the thickness of the LED 14 is smaller than the thickness of the light guide plate 16), at the second step, the positioning between the optical axis of the light guide plate 16 and the optical axis of the LED 14 may be performed, after making the surface on the floor surface 20d side of the LED 14 and the principal surface 16b of the light guide plate 16 flush. The same applies also when the thickness of the LED 14 and the thickness of the light guide plate 16 match.

At the second step, when attaching the light guide plate 16 to the first coupling member 15, the reflective sheet 21 may be fixed onto the floor surface 20d (the planar surface 20d_1 of the floor surface 20d, specifically), by using the double-sided tape 22.

At the first step and the second step, described has been a situation in which, after having fixed the FPC 12, on which the LED 14 is mounted, onto the lateral surface 20e by the fixing member 13, the LED 14 and the light guide plate 16 are coupled by the first coupling member 15. However, the present embodiment is not limited thereto. For example, after having coupled the LED 14, which is mounted on the FPC 12, and the light guide plate 16 by using the first coupling member 15, the principal surface 12b of the FPC 12 may be fixed onto the lateral surface 20e, by using the fixing member 13.

At the third step, the first surface of the second coupling member 17 that is a double-sided tape is affixed to at least part of the emission surface 16a of the light guide plate 16 closer to the LED 14 and is affixed to at least part of the surface on the opposite side of the floor surface 20d of the LED 14 closer to the light guide plate 16. As a result, the second coupling member 17 can couple the light-incident lateral surface 16c of the light guide plate 16 and the light emitting surface 14a of the LED 14.

At the fourth step, the second surface of the second coupling member 17 is affixed to at least part of the lateral wall portion 20a side of the diffusion sheet 18.

At the fifth step, the prism sheet 19 is arranged opposite to the light guide plate 16 with respect to the diffusion sheet 18. Then, at the fifth step, the portion of one end side of the lightproof sheet 30 that is a single-sided tape is affixed to the outer surface of the lateral wall portion 20a of the frame 20. Furthermore, at the fifth step, the surface on the prism sheet 19 side of the portion of the other end side of the lightproof sheet 30 is affixed to part of the lateral wall portion 20a side of the prism sheet 19. Then, at the fifth step, out of the two surfaces of the lightproof sheet 31 that is a double-sided tape, the first surface is affixed to the portion of the other end side of the lightproof sheet 30.

In the above, the planar illumination apparatus 10 in the present embodiment has been described. As in the foregoing, with the planar illumination apparatus 10 of the present embodiment, it is possible to have excellent luminance characteristics while meeting the demand for thinning.

First Modification and Second Modification of Embodiment

In the above-described embodiment, described has been a situation in which the first coupling member 15 includes a member that absorbs light or a member that reflects light. The first coupling member 15 may, however, be a member that transmits light. Thus, two embodiments in which the first coupling member 15 is a member that transmits light will be explained as a first modification and a second modification of the embodiment. In the description of the first modification and the second modification, the configurations the same as those described in the above-described embodiment may be given the identical reference signs and the explanations thereof may be omitted.

Figure 4:
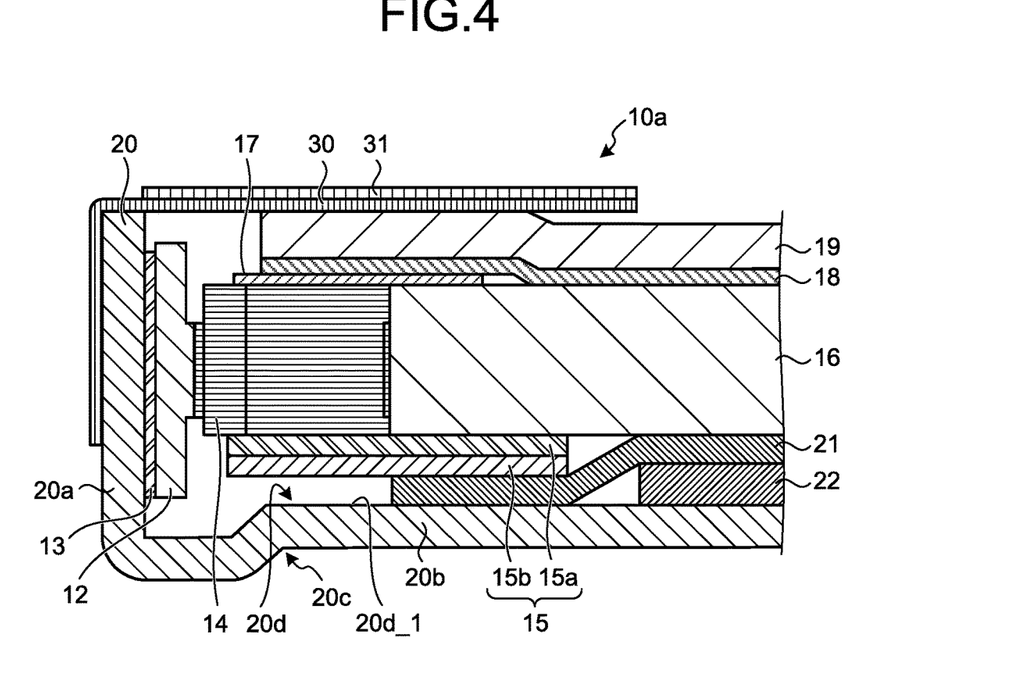
FIG. 4 is a diagram for explaining a planar illumination apparatus according to a first modification of the embodiment.
Figure 5:
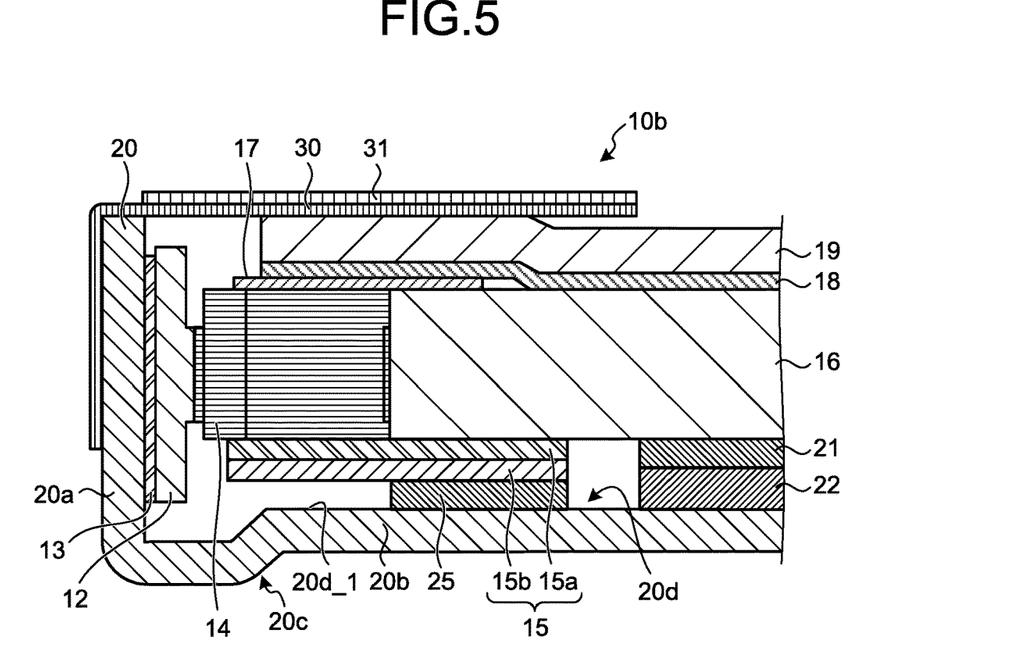
FIG. 5 is a diagram for explaining a planar illumination apparatus according to a second modification of the embodiment.

FIG. 4 is a diagram for explaining a planar illumination apparatus 10a according to the first modification of the embodiment, and FIG. 5 is a diagram for explaining a planar illumination apparatus 10b according to the second modification of the embodiment. When the first coupling member 15 is a member that transmits light, as illustrated in FIG. 4, by arranging the above-described reflective sheet 21 so as to extend up to between the first coupling member 15 and the floor surface 20d (the planar surface 20d_1 of the floor surface 20d, specifically), the reflective sheet 21 may be configured to reflect the light transmitted through the first coupling member 15 and return the reflected light to the light guide plate 16 again. Consequently, with the planar illumination apparatus 10a in the first modification, it is possible to improve the luminance.

Furthermore, not arranging the reflective sheet 21 so as to extend up to between the first coupling member 15 and the floor surface 20d, another reflective sheet 25 separate from the reflective sheet 21 may be arranged between the first coupling member 15 and the floor surface 20d (the planar surface 20d_1 of the floor surface 20d, specifically) as illustrated in FIG. 5. By such a configuration, also with the planar illumination apparatus 10b in the second modification, it is possible to improve the luminance.

Third Modification of Embodiment

Next, a third modification of the embodiment will be described. In the description of the third modification, the configurations the same as those described in the above-described embodiment may be given the identical reference signs and the explanations thereof may be omitted.

Figure 6:
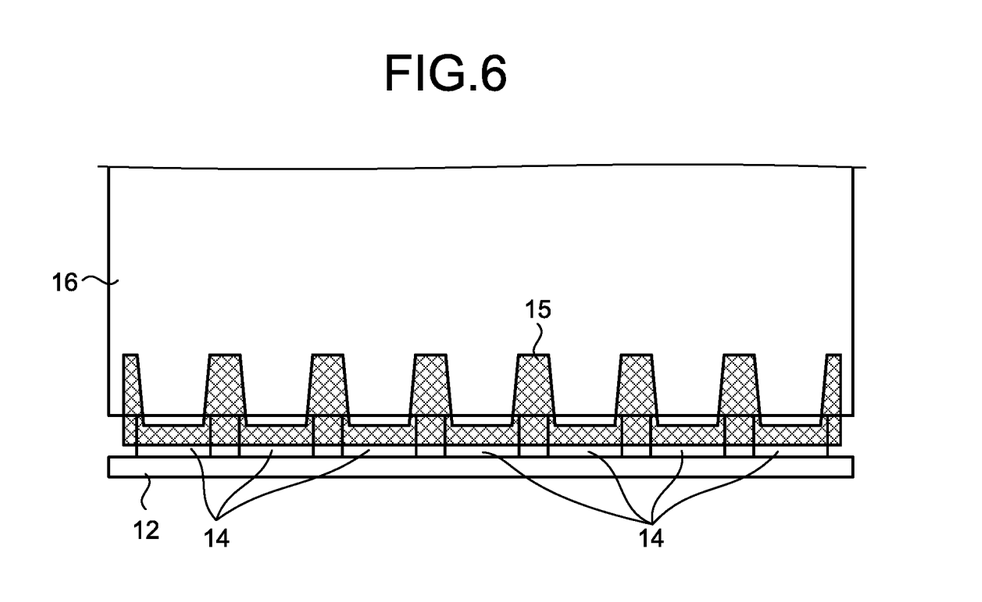
FIG. 6 is a diagram for explaining a planar illumination apparatus according to a third modification of the embodiment.

FIG. 6 is a diagram for explaining a planar illumination apparatus according to the third modification of the embodiment. As illustrated in FIG. 6, the first coupling member 15 is provided in only the area that excludes the front of the LEDs 14, that is, the light emission direction. Accordingly, in the front of each of the LEDs 14, there only exists an air layer between the principal surface 16b (see FIG. 2) of the light guide plate 16 and the floor surface 20d (the planar surface 20d_1 (see FIG. 2) of the floor surface 20d, specifically). Hence, the light that is emitted forward of the LED 14, incident on the light-incident lateral surface 16c, and reached the principal surface 16b, is introduced to the inside of the light guide plate 16, by the normal reflection at the boundary between the light guide plate 16 and the air, without going into the first coupling member 15 (the adhesive layer 15a) at a large transmittance. Consequently, with the planar illumination apparatus in the third modification, it is possible to improve the luminance.

In the third modification, described has been a situation in which the first coupling member 15 is provided in only the area that excludes the light emission direction of the LED 14. However, the adhesive layer 15a may be provided in only the area that excludes the light emission direction of the LED 14 and the base material 15b may be in the same shape as that of the embodiment, that is, in a strip-shape.

Fourth Modification of Embodiment

In the above-described embodiment, described has been a situation in which there is one adhesive layer 15a. The adhesive layer 15a may, however, be separated to an adhesive layer to be affixed to the light guide plate 16 and an adhesive layer to be affixed to the LED 14. Such an embodiment will be explained as a fourth modification of the embodiment. In the description of the fourth modification, the configurations the same as those described in the above-described embodiment may be given the identical reference signs and the explanations thereof may be omitted.

Figure 7:
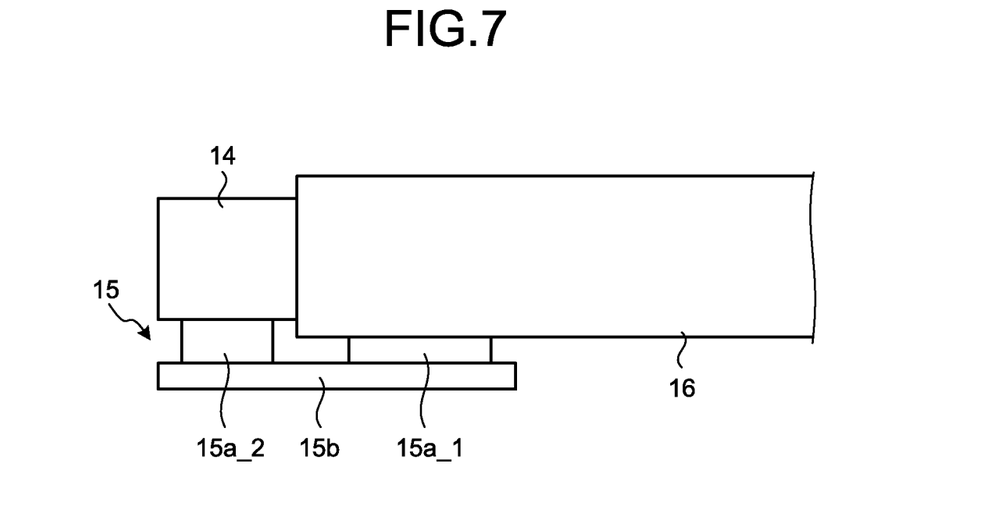
FIG. 7 is a diagram for explaining a planar illumination apparatus according to a fourth modification of the embodiment.

FIG. 7 is a diagram for explaining a planar illumination apparatus according to the fourth modification of the embodiment. As illustrated in FIG. 7, in a planar illumination apparatus in the fourth modification, the first coupling member 15 includes the base material 15b, a first adhesive layer 15a_1 that is provided on the base material 15b and adheres on the light guide plate 16, and a second adhesive layer 15a_2 that is provided on the base material 15b and adheres on the LED 14. By such a configuration, it is possible to independently adjust the thickness of the first adhesive layer 15a_1 and that of the second adhesive layer 15a_2. Hence, as illustrated in FIG. 7, even when the thickness of the light guide plate 16 and the thickness of the LED 14 are different, it is possible to make the centers (optical axes) in the thickness direction of the light guide plate 16 and the LED 14 match up.

Fifth Modification of Embodiment

In the above-described embodiment, described has been an example in which the first coupling member 15 is arranged on the planar surface 20d_1 of the floor surface 20d. The first coupling member 15 may, however, be arranged on the recessed portion 20c (the recessed surface 20d_2 of the recessed portion 20c, specifically) formed on the floor surface 20d. Such an embodiment will be explained as a planar illumination apparatus according to a fifth modification of the embodiment. In the description of the fifth modification, the configurations the same as those described in the above-described embodiment may be given the identical reference signs and the explanations thereof may be omitted.

Figure 8:
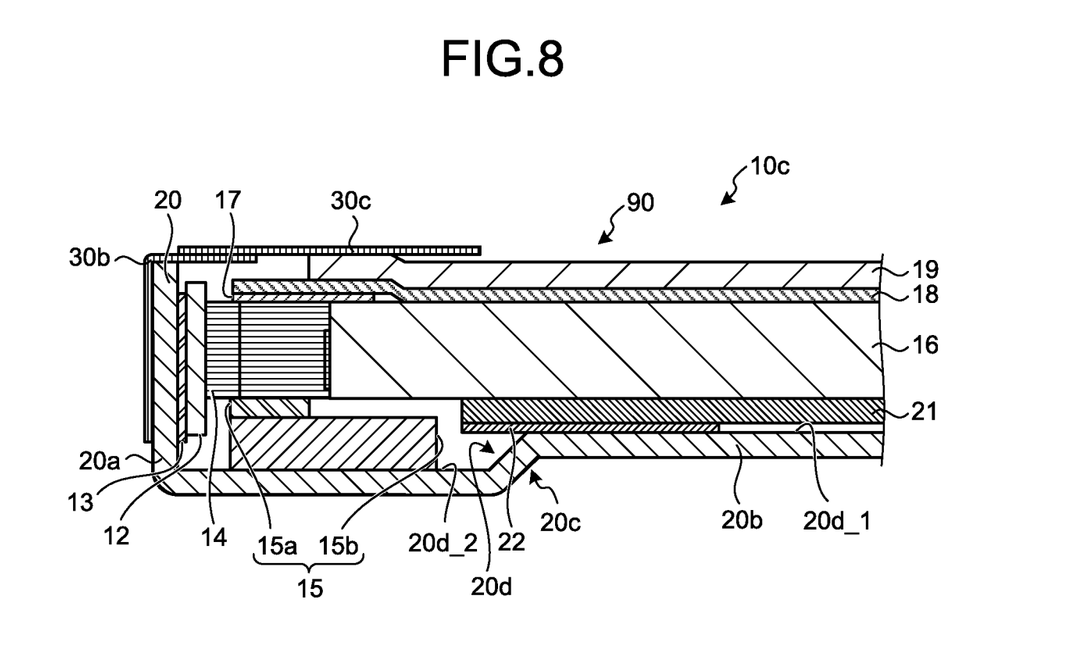
FIG. 8 is a diagram for explaining a planar illumination apparatus according to a fifth modification of the embodiment.

FIG. 8 is a diagram for explaining the planar illumination apparatus in the fifth modification of the embodiment. A planar illumination apparatus 10c in the fifth modification illustrated in FIG. 8 is different from the planar illumination apparatus 10 in the embodiment illustrated in FIG. 2, in that the first coupling member 15 is arranged on the recessed portion 20c (the recessed surface 20d_2 of the recessed portion 20c, specifically) and in that two lightproof sheets 30b and 30c are provided in place of the one lightproof sheet 30. In the planar illumination apparatus 10c illustrated in FIG. 8, the adhesive layer 15a is provided in only the area that excludes the light emission direction of the LED 14 and the base material 15b is in the same shape as that of the above-described embodiment, that is, in a strip-shape.

As illustrated in FIG. 8, when the width of the recessed portion 20c is relatively wide, a larger first coupling member 15 can be arranged on the recessed portion 20c because the first coupling member 15 is provided on the recessed portion 20c (the recessed surface 20d_2 of the recessed portion 20c, specifically).

The lightproof sheet 30b is a single-sided tape capable of blocking light, and the portion of one end side is affixed to the outer surface of the lateral wall portion 20a of the frame 20.

The lightproof sheet 30c is a double-sided tape capable of blocking light, and the surface on the prism sheet 19 side of the portion of one end side is affixed to the portion on the other end side of the lightproof sheet 30b. The surface on the prism sheet 19 side of the portion of the other end side of the lightproof sheet 30c is affixed to part of the lateral wall portion 20a side of the prism sheet 19. The surface opposite to the prism sheet 19 of the lightproof sheet 30c is affixed to a liquid-crystal display apparatus that uses the planar illumination apparatus 10c as a backlight. By such a configuration, the number of sheets present on the light emission direction side of the prism sheet 19 becomes one. Hence, as compared with when the number of sheets present on the light emission direction side of the prism sheet 19 is two or more, it is possible to achieve thinning.

Sixth Modification of Embodiment

In the above-described embodiment, described has been a situation in which the first coupling member 15 is a single-sided tape. The first coupling member 15 may, however, be a double-sided tape. Such an embodiment will be explained as a planar illumination apparatus according to a sixth modification of the embodiment. In the description of the sixth modification, the configurations the same as those described in the above-described embodiment may be given the identical reference signs and the explanations thereof may be omitted.

Figure 9:
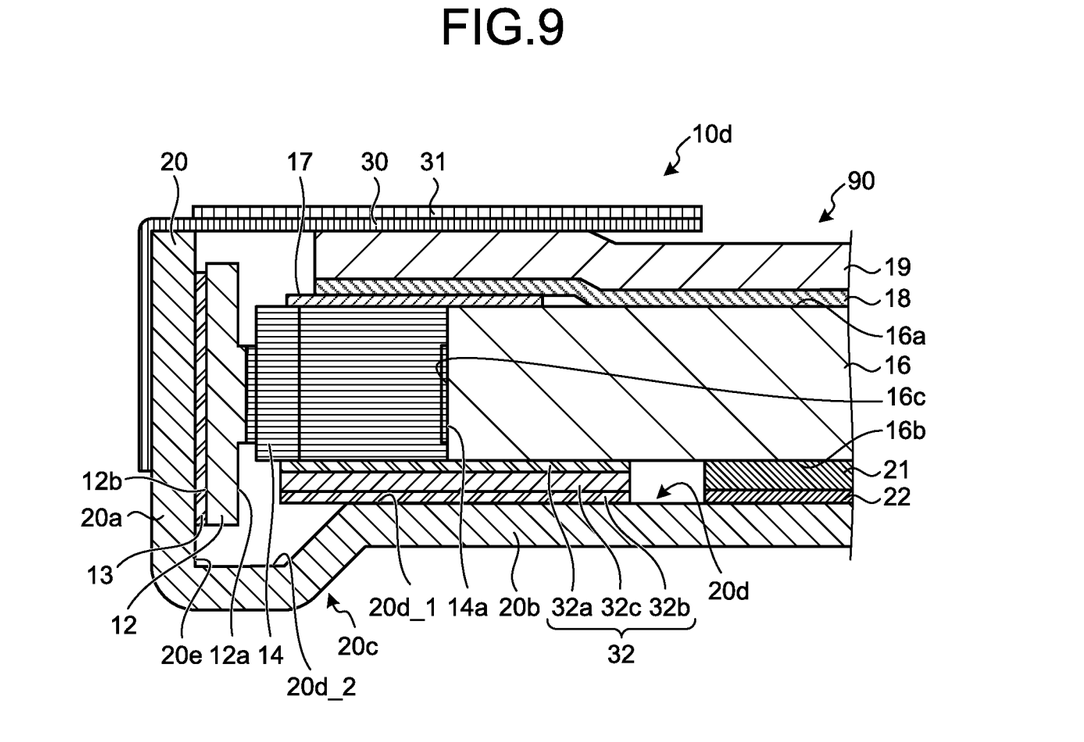
FIG. 9 is a diagram for explaining a planar illumination apparatus according to a sixth modification of the embodiment.

FIG. 9 is a diagram for explaining the planar illumination apparatus in the sixth modification of the embodiment. As illustrated in FIG. 9, a planar illumination apparatus 10d in the sixth modification includes a first coupling member 32 in place of the first coupling member 15.

The first coupling member 32 couples the light guide plate 16 and the LED 14 optically or structurally. The first coupling member 32 further fixes the light guide plate 16 and the LED 14 onto the frame 20. The first coupling member 32 is a double-sided tape, and includes adhesive layers 32a and 32b and a base material 32c. The adhesive layers 32a and 32b are silicone or acrylic, for example. The base material 32c is PET, for example.

The adhesive layer 32a is arranged on a principal surface on the LED 14 side of the base material 32c. The adhesive layer 32a adheres on at least part of the principal surface 16b of the light guide plate 16 closer to the LED 14, and adheres on at least part of the surface on the floor surface 20d side of the LED 14 closer to the light guide plate 16. Accordingly, at least part of the principal surface 16b of the light guide plate 16 and at least part of the surface on the floor surface 20d side of the LED 14 are to be affixed to the first coupling member 32. As a result, the first coupling member 32 couples the light-incident lateral surface 16c of the light guide plate 16 and the light emitting surface 14a of the LED 14.

The adhesive layer 32b is arranged on a principal surface on the floor surface 20d side of the base material 32c. The adhesive layer 32b adheres on the floor surface 20d. Accordingly, the first coupling member 32 fixes the light guide plate 16 and the LED 14 onto the floor surface 20d, consequently onto the frame 20.

In the sixth modification, even when the planar illumination apparatus 10d is subjected to some kind of force from the outside, the LED 14 and the light guide plate 16 are restrained from moving because the LED 14 and the light guide plate 16 are being fixed onto the frame 20. As a result, it is suppressed that the LED 14 and the light guide plate 16 come in contact with other members, that the optical axis of the light guide plate 16 is displaced with respect to the optical axis of the LED 14, and that the spacing between the LED 14 and the light guide plate 16 is widened. Consequently, with the planar illumination apparatus 10d of the sixth modification, it is possible to suppress the breakage of the LED 14 and the light guide plate 16 and the changes in the optical characteristics thereof.

In the above, the embodiment and the first to sixth modifications have been described. It should be noted that the present invention is not limited by the above-described embodiment. The invention includes ones that are configured by appropriately combining the above-described respective constituent elements. Further effects and modifications can be readily derived by those skilled in the art. Accordingly, a more extensive form of the invention is not limited to the above-described embodiment, and various modifications are possible.

According to one aspect of the present invention, it is possible to have excellent luminance characteristics while meeting the demand for thinning.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar illumination apparatus comprising:
   a light guide plate that emits light from an emission surface, the light being incident on a lateral surface of the light guide plate;
   a light source that is arranged on the lateral surface side and has a light emitting surface that emits light to be incident on the lateral surface, the light source comprising a plurality of point light sources;
   a substrate that has two principal surfaces, a surface opposite to the light emitting surface of each of the point light sources source being mounted on one of the principal surfaces;
   a frame that has a lateral surface and a floor surface, and accommodates the light guide plate, the light source, and the substrate; and
   a first coupling member that is arranged between the light guide plate and the floor surface and between the light source and the floor surface, and couples the light guide plate and the light source, and wherein
      one surface of the first coupling member is affixed to both of at least part of a surface opposite to the emission surface of the light guide plate and at least part of a surface on the floor surface side of the light source, and
      the first coupling member is provided in an area that excludes a light emission direction of each of the point light sources;
   wherein the first coupling member couples the light guide plate and the light source so as to make both of the surface opposite to the emission surface of the light guide plate and the surface on the floor surface side of the light source flush,
   wherein the first coupling member has a plurality of cut-out portions in front of each of the point light sources formed in a comb shape.

2. The planar illumination apparatus according to claim 1, further comprising a fixing member that fixes the substrate onto the lateral surface of the frame.

3. The planar illumination apparatus according to claim 2, wherein the first coupling member is a single-sided tape, and the fixing member is a double-sided tape.

4. The planar illumination apparatus according to claim 2, wherein both the first coupling member and the fixing member are double-sided tapes, and the first coupling member fixes the light guide plate and the light source onto the frame.

5. The planar illumination apparatus according to claim 1, wherein the first coupling member includes a member that absorbs light or a member that reflects light.

6. The planar illumination apparatus according to claim 1, wherein the first coupling member is a member that transmits light, and the planar illumination apparatus further comprises a reflective sheet that is arranged between the first coupling member and the floor surface and that reflects light transmitted through the first coupling member.

7. The planar illumination apparatus according to claim 1, wherein the first coupling member includes a base material, and an adhesive layer that is provided on the base material and adheres on the light guide plate and the light source, and the adhesive layer is provided in an area that excludes a light emission direction of the light source.

8. The planar illumination apparatus according to claim 1, wherein the first coupling member includes a base material that has a light source side and a floor side, a first adhesive portion that is provided on the light source side of the base material and adheres on the light guide plate, and a second adhesive portion that is provided on the light source side of the base material and adheres on the light source.

9. The planar illumination apparatus according to claim 1, further comprising a second coupling member that is arranged opposite to the first coupling member with respect to the light guide plate and the light source, and couples the light guide plate and the light source.

10. The planar illumination apparatus according to claim 9, further comprising:
   a diffusion sheet that is arranged so as to cover the emission surface and at least part of a surface opposite to the floor surface of the light source, and diffuses light emitted from the emission surface, wherein
      the second coupling member is arranged between the diffusion sheet and the light guide plate and arranged between the diffusion sheet and the light source, and fixes the diffusion sheet onto the light guide plate and the light source, and directly contacts with the diffusion sheet.

11. The planar illumination apparatus according to claim 9, wherein the second coupling member is a double-sided tape.

12. A planar illumination apparatus comprising:
a light guide plate that emits light from an emission surface, the light being incident on a lateral surface of the light guide plate;
a light source that is arranged on the lateral surface side and emits light to be incident on the lateral surface, the light source comprising a plurality of point light sources;
a first coupling member that is arranged opposite to the emission surface of the light guide plate, and is affixed to both of the light guide plate and the light source so as to couple the light guide plate and the light source directly, and
a second coupling member that is arranged on the emission surface of the light guide plate, and is affixed to both of the light guide plate and the light source so as to couple the light guide plate and the light source directly, and
wherein the first coupling member is provided in an area that excludes a light emission direction of each of the point light sources;
wherein the first coupling member couples the light guide plate and the light source so as to make both of the surface opposite to the emission surface of the light guide plate and the surface on the floor surface side of the light source flush,
wherein the first coupling member has a plurality of cut-out portions in front of each of the point light sources formed in a comb shape.

13. The planar illumination apparatus according to claim 12, further comprising:
a diffusion sheet that is arranged so as to cover at least part of the emission surface and at least part of a surface on the second coupling member surface side of the light source, and diffuses light emitted from the emission surface, wherein
the second coupling member is arranged between the diffusion sheet and both of the coupled light guide plate and the light source in the thickness direction, and directly contacts with the diffusion sheet.

14. The planar illumination apparatus according to claim 12, wherein the second coupling member is a double-sided tape, and fixes the diffusion sheet onto the light guide plate and the light source.

15. The planar illumination apparatus according to claim 12, wherein the first coupling member includes a base material, a first portion that is provided on the base material and affixed to the light guide plate, and a second portion that is provided on the base material and affixed to the light source.

16. A planar illumination apparatus comprising:
a light guide plate that emits light from an emission surface, the light being incident on a lateral surface of the light guide plate;
a light source that is arranged on the lateral surface side and emits light to be incident on the lateral surface;
a coupling member that is arranged on the emission surface of the light guide plate, and is affixed to both of the light guide plate and the light source so as to couple the light guide plate and the light source directly, and
a diffusion sheet that is arranged so as to cover at least part of the emission surface and at least part of a surface on the coupling member surface side of the light source, and diffuses light emitted from the emission surface, wherein
the coupling member is arranged between the diffusion sheet and both of the coupled light guide plate and the light source in the thickness direction, and
a member that reflects light is not arranged between the coupling member and the diffusion sheet;
wherein the coupling member couples the light guide plate and the light source so as to make both of the surface opposite to the emission surface of the light guide plate and the surface on the floor surface side of the light source flush,
wherein the coupling member has a plurality of cut-out portions in front of each of the point light sources formed in a comb shape.

17. The planar illumination apparatus according to claim 16, wherein an edge of the diffusion sheet exceeds from the lateral surface of the light guide plate and overlaps with the light source in top view, and an edge of the lateral surface of the light guide plate directly contact with the coupling member.

18. The planar illumination apparatus according to claim 16, wherein the coupling member is a tape formed with an adhesive layer.

19. The planar illumination apparatus according to claim 16, wherein the thickness of the coupling member in the light emitting direction of the light guide plate is less than the thickness of the diffusion sheet in the light emitting direction of the light guide plate.

* * * * *